Patented Aug. 16, 1932

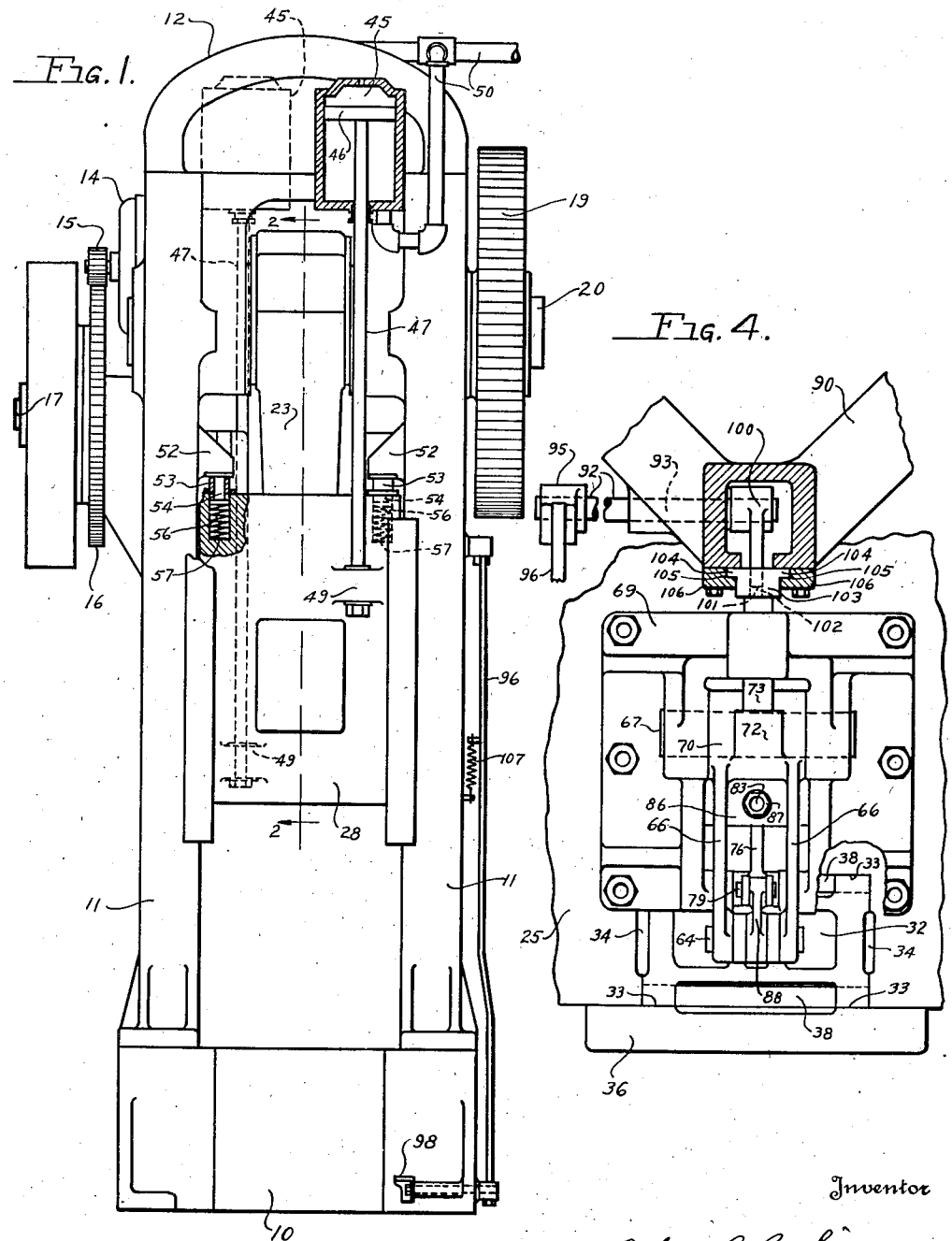

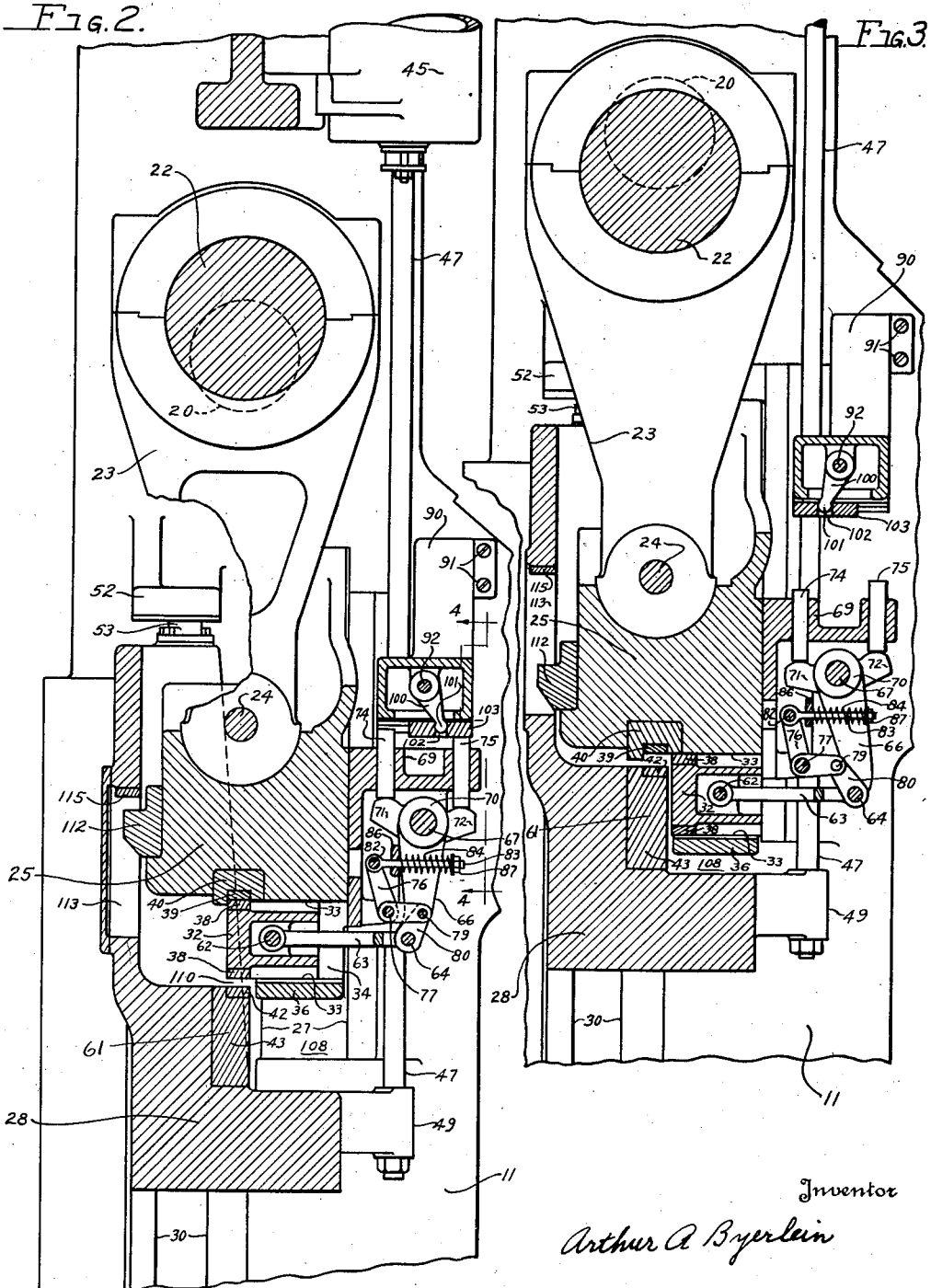

1,872,242

UNITED STATES PATENT OFFICE

ARTHUR A. BYERLEIN, OF DETROIT, MICHIGAN, ASSIGNOR TO GENERAL MACHINERY CORPORATION, OF HAMILTON, OHIO, A CORPORATION OF DELAWARE

PRESS

Application filed May 1, 1930. Serial No. 449,056.

This invention relates to presses or the like and particularly to control means therefor.

One of the principal objects of the invention is the provision in a press or the like having a driving slide and an associated driven slide, of means of simple construction for constantly urging the driven slide in one direction and for positively driving the driven slide in the opposite direction.

Another object of the invention is the provision in a press of this type of resilient fluid pressure actuated means for urging the driven slide towards the driving slide.

Another object of the invention is the provision of a press especially suitable for hot metal forging operations, including operating means therefor comprising a few simple parts which may be readily and positively actuated to provide the required driving connection for the driven slide.

Other objects and advantages of the invention will be apparent from the following description, the accompanying drawings and the appended claims.

In the drawings, which discloses a preferred embodiment of the invention—

Fig. 1 is a side elevational view of a press constructed in accordance with this invention;

Fig. 2 is a sectional view taken on the plane of the line 2—2 of Fig. 1 showing the slide actuating mechanism in driving position;

Fig. 3 is a sectional view similar to Fig. 2 showing the slide actuating mechanism in relieved position; and Fig. 4 is a fragmentary view of the press control mechanism, some of the parts being shown in section on line 4—4 of Fig. 2.

In the drawings, in which like characters of reference designate like parts throughout the several views thereof, a press is shown having a bed 10, spaced uprights or side frames 11 with which are associated suitable guideways for the press slides, and an arch member 12. Suitably supported on the press for the actuation of the slides is a driving motor 14 having a pinion 15 in meshing engagement with a driven gear 16 which is carried on a driven shaft 17. The shaft 17 carries a pinion (not shown) which meshes with a driven gear 19 suitably fixed to the crank shaft 20 of the press. The shaft 20 is supported for rotational movement within suitable bearings attached to side frames and is provided with a crank or throw 22 upon which is rotatably positioned one end of a connecting rod or link 23. The opposite end of the link 23 is pivotally connected at 24 to a driving slide 25 to provide a driving connection with the crank 22 so that upon rotational movement of the crank shaft 20 the driving slide 25 will be given a reciprocating movement. Guide ways 27 (see Fig. 2) are provided on the side frames of the press for guiding the slide 25 during its reciprocating movement. A second slide member or driven slide 28 is positioned within the press side frames adjacent the slide 25 and is adapted to slide within the guide ways 30.

A press actuating mechanism is provided whereby the driving slide and its associated parts may be operated continuously, while the driven slide is adapted to remain at rest at the uppermost position of its stroke except during times that the press is in actual working operation. In accordance with this invention the driven slide is constantly urged upwardly or to inffective position, fluid pressure means being herein shown as adaptable for this purpose. The actuating mechanism is movably related to one of the slides to provide a driving connection with the other slide and a suitable control mechanism is provided for effecting or disengaging the drive at the will of the press operator. The provision of such an actuating mechanism permits presses of large capacity and great weight to be operated at high speeds. For example, presses ranging in pressure capacity from 600 to 1000 tons have been succesfully operated by means of conventional clutches at speeds of about 30 strokes per minute. Any effort to increase the speed of these large presses a substantial amount over that mentioned has resulted in considerable difficulty in maintaining the clutches in working condition owing to the tremendous strains encountered in quickly starting and stopping the heavy press parts. The present invention provides a means whereby these large presses may be successfully operated at speeds as high as 100 strokes per minute and, as mentioned above, comprises an arrangement of parts in which the bulk of the driving mechanism may be operated continuously, and in which only a relatively small part of the press need be started and stopped for each working operation. This press is therefore especially suitable for hot metal forging operation. As shown, the press sliding mechanism comprises two slide parts; a driving part which is adapted to remain in continuous operation, and driven tool or die carrying slide which may be operated intermittently at the will of the operator and may be quickly and readily connected to or disconnected from the driving slide without causing undue shock or strain to the press structure.

As shown the driven slide actuating mechanism comprises a transversely movable control slide or gag 32 which is shown slidably mounted adjacent the bottom portion of the driving slide 25. Suitable control means are provided for moving the gag 32 from a position out of engaging alignment between the slides 25 and 28, (at which time the slide 25 may reciprocate freely without moving the slide 28), to a position between the slide members to cause positive movement of the driven slide 28 downwardly upon reciprocation of the driving member. The gag 32 preferably comprises a box like structure having suitable bearing or slide surfaces 33 adjacent each of its four corners which are adapted to engage the walls of a guide way formed as a depression 34 in the lower portion of the driving slide 25. A cover member 36 is attached to the bottom of the driving slide 25 to enclose the depression 34 for the support of the gag 32 so that the gag may be reciprocated in a direction transverse to the direction of travel of the driving slide 25 and may, as mentioned above, be moved from a position of engagement between the slides 25 and 28 to a position out of engaging alignment. The forward end of the gag is preferably provided with suitable control contacting surfaces 38 and when in driving position one of these is adapted to contact with the plate member 39 which is suitably fixed at 40 within the driving slide 25, while the other member 38 is adapted to contact with the plate 42 suitably fixed within block 43 forming part of the driven slide 28.

The fluid pressure means constantly urging the driven slide 28 upwardly preferably comprises cylinders 45 suitably attached to the press frame and having pistons 46 slidable therein. The pistons are connected as by means of the rods 47 to the driven slide; the rods being attached thereto at the integrally formed ears 49. The cylinders are connected as by means of the pipes 50 to a suitable source of fluid pressure such as an air compressor (not shown) so that pressure may be maintained within the cylinders 45 below the pistons 46 to constantly urge the driven slide 28 in an upward direction. Upward travel of the slide 28 is limited by suitable stops which, as shown, comprise fixed lugs 52 which are attached to the press frame and are adapted to engage the stop members 53 which are attached to the press slide 28. Yielding means such as the spring pressed plungers 54 are provided to bring the slide to rest against the stops 52 without appreciable shock. As shown the plungers 54 are adapted to slide within the hollow stop members 53 and are constantly pushed outwardly by means of the springs 56 which are positioned within the slide 28 as at 57. As the slide 28 moves upwardly the extending plungers 54 strike the stops 52 and cause the springs 56 to compress thereby retarding the movement of the slide before the stop members 53 positively engage the stops 52.

As a means of operation the gag 32 carries a cross pin 62 to which a link 63 is attached. The opposite end of the link 63 is carried on a pin 64 which is positioned on the outer end of a pivoted lever 66; the lever being carried upon a pin at 67 which is suitably supported as within a frame 69 fixed to the driving slide 25. Swinging movement of the lever 66 causes the gag 32 to be moved from engaging or driving position to a position out of driving alignment. As shown the hub portion 70 of the lever 66 is provided with oppositely positioned outwardly extending lugs 71 and 72 which are adapted to be engaged by the pins 74 and 75 suitably journaled for reciprocating movement within the frame 69. Yielding means are provided for resiliently maintaining the gag 32 in either one of the two mentioned positions and comprises a bell crank 76 which is pivotally supported on a pin 77 carried by the frame 69. One end of the bell crank 76 has pivotally attached to it at 79 a link 80 whose opposite end is carried on the cross pin 64 which provides also a pivotal connection between the link 63 and the end of the lever 66. The opposite end of the bell crank 76 has pivotally attached to it at 82 a rod or stud 83 upon which a spring 84 is positioned. One end of the spring 84 bears against a web 86 of the frame 69 while the opposite end is held against the nut 87 carried on the end of the stud 83 so that the tension of the spring will tend to rotate the bell crank 76 in a clockwise direction to always urge the link 80 downwardly and to resiliently maintain the gag 50 in either of its positions.

A suitable supporting means such as the bracket 90 is held between the frame members 11, as by means of the attaching screws 91, for the support of suitable control mechanism for actuating the gag 32. The control mechanism comprises a rotatable shaft 92 which is suitably journaled at 93 within the bracket 90 and carries at one end a lever 95 having a link connection 96 with an actuating member 98 which may be a foot treadle as shown or any other suitable means for actuating the control. The opposite end of the rotatable shaft 92 carries a lever 100 whose end portion 101 is received within a depression 102 of a slide block 103. Slide block 103 is provided with flanges 104 which are adapted to slide within the grooves 105 of the plates 106 which are fixed to the bottom of the bracket 90. The connection between the slide block 103 and the lever 100 is such that upon depression of the foot treadle 98 the block 103 will be caused to slide in one direction, and upon release will be caused to slide in the opposite direction as by means of the spring 107. The block 103 is thus reciprocally mounted so the block may be moved in one direction to a position to engage the pin 74 (as shown in Fig. 3), and in the opposite direction to a position in alignment with the pin 75 (as shown in Fig. 2).

During times that the driven slide 28 is not being actuated but while the driving slide 25 may be freely reciprocated by the crank shaft 20, during which time the gag 32 is being carried in a position out of driving engagement between the two slides, the gag travels in a clearance space 108 which is provided to the right of the portion 61 of the driven slide. When the gag 32 is in operating position (as shown in Fig. 2) each downward stroke of the driving slide 25 causes the gag to contact with and carry down with it the driven slide 28. At the end of the driving stroke the driven slide follows the driving slide upwardly under urge of the pistons 46 of the lifting mechanism until the stops 52 are encountered. When it is desired to release the driven slide from driving engagement this is accomplished by moving the slide block 103 into position above the stud 74, such as by releasing the treadle 98, so that upon the next upward movement of the driving slide 25 and its associated parts the stud 74 will be forced downwardly in its frame 69 upon contact with the block 103 to swing the lever 66 in a counterclockwise direction, as viewed in Fig. 3, to thereby move the gag 32 to the right and into relieved or non-engaging position.

As shown, a clearance space, designated at 110, is provided between the upper face of the driven slide 28 when it is resting against the stop 52 and the bottom contacting face of the gag 32 when the driving slide and gag are in their uppermost position. The provision of this clearance space permits a sufficient time interval and travel at the top of the driving slide stroke for the gag to be moved into or out of operating position while clear of the driven slide. When the driven slide 28 is to be actuated the foot treadle 98 or other actuating means is moved to swing the slide block 103 into position above the stud 75 so that upon the next upward stroke of the driving slide the stud 75 will be forced downwardly to rotate the lever 66 in a clockwise direction, as viewed in Fig. 2, and to move the gag 32 into operating alignment between the contacting block 39 of the driving slide and the contacting block 42 of the driven slide. The gag will then be held resiliently in place under urge of the spring 84 through the bell crank 76 and the link 80.

Positive means are provided for insuring upward movement of the driven slide 28 from its lowermost position and comprises a latch member 112 which is fixed to the driving slide 25 and is adapted at times to engage the driven slide in case of failure of proper operation of the pressure cylinders. A slot 113 is provided in the driven slide 28 within which the latch may move freely as long as the driven slide is in the uppermost position. If, when in the downward position, the driven slide should tend to lag behind the driving slide in its return the latch 112 will engage the end of the slot 113 to positively move the slide 28 upwardly. As shown, a contacting block 115 is provided adjacent the upper end of the slot 113 and is positioned in alignment with the latch member 112 so that upon upward movement of the driving slide any lag in the movement of the driven slide will result in positive engagement between the slides which will cause the driven slide to be positively moved upwardly; the upward movement being continued by the air cylinders until the limit stops are reached.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A device of the class described comprising a frame, a driving member slidably mounted therein, means for reciprocating said driving member, a driven member reciprocally positioned adjacent said driving member, means movably mounted on one of said members and adapted to engage the other member for moving said driven member in one direction upon corresponding movement of the driving member, means operated by movement of the driving member for actuating said movable means, and means for moving the driven member in the opposite direction.

2. A device of the class described comprising a frame, a driving member slidably mounted therein, means for reciprocating said driving member, a driven member reciprocally positioned adjacent said driving member, means movably mounted on one of said members and adapted to engage the other member for moving said driven member in one direction upon corresponding movement of the driving member, means for actuating said movable means, and fluid pressure actuated means for moving the driven member in the opposite direction.

3. In a press, a vertically movable die slide, fluid pressure means for constantly urging said die slide upwardly, a constantly reciprocable member, and a gag movable to a position causing downward movement of said die slide by downward movement of the member.

4. In a press of the class described, a movable die slide, means for urging the slide in one direction, means for limiting the movement of the slide in said direction, a reciprocable member, a movable member adapted to be moved to a position causing movement of the slide in the opposite direction upon movement of the reciprocable member in a like direction, the movement of the reciprocable member being greater than the movement of the slide in the direction of slide travel thereby providing a clearance space for the actuation of the movable member, and means operable in timed relation with said reciprocable member for operating said movable member.

5. In a press of the class described, a movable die slide, a reciprocable member, a movable member adapted to be moved to a position causing movement of the die slide upon movement of the reciprocable member, actuating means automatically operable at a predetermined position in the cycle of reciprocation of the reciprocable member for actuating said movable member, and control means for manually governing the actuating means.

6. A device of the class described comprising a frame, a driving member slidably mounted therein, means for reciprocating said driving member, a slidably mounted driven member, means for constantly urging said driven member in one direction, means movably mounted on said driving member and adapted to be moved to a position between said members to positively move said driven member in the opposite direction upon corresponding movement of said driving member, and means for actuating said movable means.

7. A device of the class described comprising a frame, a driving member slidably mounted therein, means for reciprocating said driving member, a driven member slidably mounted, means for urging said driven member in one direction, means attached to said frame and cooperating with said driven member to limit the movement of said driven member in said direction, said limiting means comprising a resiliently contacting positive stop, means slidably mounted on one of said members and movable to a position between said members for positively moving said driven member in the opposite direction upon corresponding movement of said driving member, and manually controlled means operated by the driving member for actuating said slidable member.

8. A device of the class described comprising a frame, a driving member slidably mounted therein, means for reciprocating said driving member, a slidably mounted driven member adjacent said driving member, means for constantly urging said driven member in one direction, means movably mounted on one of said members and adapted to be moved to a position between said members to positively move said driven member in the opposite direction upon corresponding movement of said driving member, means for moving said movable means from said position to a position out of engaging alignment between said members, and resilient means for maintaining said movable means in either of said positions.

9. A device of the class described comprising a frame, a driving member slidably mounted therein, means for reciprocating said driving member, a driven member slidably mounted in said frame, resilient means supported on said frame and attached to the driven member for constantly urging said member in one direction, a gag slidably mounted on said driving member and adapted to be moved from a position out of engaging alignment between said members to a position between said members for positively moving said driven member in the opposite direction during corresponding movement of the driving member, means attached to the driving member for actuating said gag, said actuating means comprising resilient means for maintaining the gag in either of said positions, and means for controlling the operation of the actuating means.

10. A press of the class described comprising a frame, a slide movably positioned therein, means for reciprocating said slide, a second slide movably mounted in said frame, means for urging said second slide in one direction, said last mentioned means comprising an air cylinder and piston therefor, fluid supply means for maintaining fluid pressure in said cylinder and against said piston, means movably mounted on one of said slides and adapted to be moved to a position between said slides to positively move said second slide in the opposite direction upon corresponding movement of said first mentioned slide, and means for actuating said movable means.

11. A press of the class described comprising a frame, a driving slide movably positioned therein, means for reciprocating said slide, a driven slide movably mounted in said frame, an air cylinder supported on said frame, a piston therefor carried by said driven slide, means for maintaining fluid pressure within said cylinder and against said piston to constantly and resiliently urge said driven slide upwardly, stop means comprising a resiliently contacting positive stop member adapted to limit the travel of said driven slide upwardly, a member attached to one of said slides and adapted to positively move said driven slide upwardly during movement of the driving slide in the same direction, means movably mounted on one of said slides and adapted to be moved into position between said slides for positively moving said driven slide downwardly during movement of the driving slide in the same direction, and means for actuating said movable means.

12. In a press, a reciprocable die slide, driving means therefor, means for moving the die slide in one direction, power transmitting means adapted to be driven by the driving means to move the die slide in the opposite direction, and means for positively moving said power transmitting means to operative and inoperative positions at predetermined times in the cycle of operation of the driving means.

13. In a press, a reciprocable die slide, driving means therefor, means for moving the die slide in one direction and operating means connected to the driving means for moving the die slide in the opposite direction, said operating means being movable to operative and inoperative positions, means automatically operable at the termination of a cycle of operation of the driving means for actuating said operating means, and means for maintaining said operating means in the selected position during the cycle of operation.

14. In a press of the class described, a driving member, a movable die slide, movable means for actuating the die slide in one direction by movement of the driving member, means independent of the driving member for actuating the die slide in the opposite direction, and operating means for the movable means actuated by movement of the driving means.

15. In a press of the class described, a driving member, a movable die slide, movable means for actuating the die slide a full stroke in only one direction by movement of the driving member, means independent of the driving member for actuating the die slide in the opposite direction, operating means for the movable means actuated by movement of the driving means, and manually actuated means for governing the operation of the operating means.

16. In a press, a movable die slide, fluid pressure means for constantly urging said die slide away from the work position, a constantly movable member, and means for establishing a driving connection between said slide and said member for positively moving said slide towards the work position.

17. In a press, a movable die slide, fluid pressure means for constantly urging said die slide away from the work position, a constantly rotatable crank shaft, a crank arm operated thereby, and means for establishing a driving connection between said crank arm and said slide for moving said slide towards the work position and against the force exerted by said fluid pressure means.

18. In a press, a normally idle die slide, fluid pressure means for constantly urging said die slide to the normal position, a constantly movable driving member, controllable means for operably connecting the die slide with the constantly movable member for movement in the direction opposite to the direction of force applied by the fluid pressure means, and means operated in timed relation with said movable member for automatically moving said controllable means.

19. In a press, a vertically movable die slide, fluid pressure means for constantly urging the die slide upwardly, a constantly movable member, and means movable in one direction by movement of the constantly movable member to a position causing downward movement of said die slide to engage the work at a speed coordinated with the speed of the constantly movable member, and movable in the opposite direction by movement of the constantly movable member to a position out of range of driving engagement with the die slide.

20. A press of the class described comprising a frame, a reciprocable driving slide, guides on said frame engaged by said driving slide, a driven member reciprocally mounted in said frame adjacent said driving slide, means for establishing a driving connection between said slide and member to move said member positively in one direction, and fluid pressure means for constantly urging said member in the other direction.

21. A press of the class described comprising a frame, a reciprocable driving slide, guides on said frame engaged by said driving slide, a driven member reciprocally mounted in said frame adjacent said driving slide, means for establishing a driving connection between said slide and member to move said member positively in one direction, mechanism operated in timed relation with said slide for automatically operating said means at predetermined times in the cycle of operation of said slide, and means for moving said member in the other direction.

22. A press of the class described comprising a frame, a reciprocable driving slide, guides on said frame engaged by said driving slide, a driven member reciprocally mounted in said frame adjacent said driving slide, means for establishing a driving connection between said slide and member to move said member positively in one direction, and yielding means for moving said member in the other direction.

In testimony whereof I hereto affix my signature.

ARTHUR A. BYERLEIN.